United States Patent [19]

Kamei et al.

[11] Patent Number: 4,654,265
[45] Date of Patent: Mar. 31, 1987

[54] POROUS HOLLOW FIBER

[75] Inventors: Eiichi Kamei; Yasushi Shimomura; Mitsuo Yamanaka, all of Hirakata, Japan

[73] Assignee: Ube Industries, Ltd., Ube, Japan

[21] Appl. No.: 870,709

[22] Filed: Jun. 4, 1986

[30] Foreign Application Priority Data

Jun. 5, 1985 [JP] Japan .................. 60-121797

[51] Int. Cl.⁴ .................................. D02G 3/00
[52] U.S. Cl. .............................. 428/398; 428/375; 428/376; 428/400; 210/500.23
[58] Field of Search ............... 428/398, 375, 376, 400; 210/500.23

[56] References Cited

U.S. PATENT DOCUMENTS 3,320,088  5/1967  Feild .................. 428/394
4,001,367  1/1977  Guthrie et al. ........ 524/117

Primary Examiner—George F. Lesmes
Assistant Examiner—S. A. Gibson
Attorney, Agent, or Firm—Frishauf, Holtz, Goodman & Woodward

[57] ABSTRACT

In a porous hollow fiber having a large number of micropores in its surrounding wall, the improvement in which walls of said pores are coated with ethylene oxide-grafted nylon, such as ethylene oxide-grafted nylon 6.

7 Claims, 4 Drawing Figures

POROUS HOLLOW FIBER

BACKGROUND OF THE INVENTION

1. Field of the invention

The present invention relates to a porous hollow fiber which is suitable for separation of substances contained in a fluid, particularly water, for the purpose of purification thereof. More particularly, this invention relates to a porous hollow fiber which is prominently improved in hydrophilic nature and has a function of filtration in a wide range such as micro-filtration and ultrafiltration with simply varying the coating conditions of ethylene oxide-grafted nylon.

2. Description of prior arts

A porous hollow fiber of a polymer material is used widely as a device for precise filtration and ultrafiltration of various substances. For example, it is used in the field of separation and purification of water or an aqueous solution, or in the clinical field.

In the case that the precise filtration or ultrafiltration of water or an aqueous solution is performed by using a porous hollow fiber or film, the porous hollow fiber or film needs to have hydrophilic nature. As a process of producing a porous hollow fiber or porous film having the hydrophilic nature, there is known a process which comprises steps of dissolving a polymer material in an appropriate solvent mixture containing a volatile solvent and a swelling agent or poor solvent to prepare a homogeneous solution, casting the solution to form a film, then removing the volatile solvent partially or completely through evaporation, followed by further removing through extraction the remaining non-solvent or swelling agent by immersing the film in a solidifying medium to form a large number of micropores in the film, that is called, a phase transition process. Also known is a process comprising steps of preparing a porous film of a polymer material containing a soluble material dispersed therein and then removing said soluble material by dissolving it with an appropriate solvent to form a large number of micropores in the film. The above-described processes utilizing removing the soluble material are referred to hereinafter as Conventional Process 1.

Recently, an alternative process using a hollow fiber or film of a thermoplastic resin such as high-density polyethylene, polypropylene and poly(4-methylpentene-1) has been proposed and now is used in practice. In this process, the hollow fiber or film which has been spun is heat-treated and then subjected to a drawing process at a temperature of specific range and/or in a specific medium to form pores in the surrounding wall of the fiber or in the film. The process is referred to hereinafter as Conventional Process 2. In this process, a porous hollow fiber or film having excellent mechanical properties can be obtained.

However, there are drawbacks in the above-mentioned conventional processes. For instance, the process for preparing a hollow fiber or film having hydrophilic nature according to Conventional Process 1 requires a complicated process as described hereinbefore, and as a result the manufacturing cost becomes high. On the other hand, since the porous hollow fiber of film prepared in Conventional Process 2 is hydrophobic, the resulting fiber or film needs to be subjected to a supplemental procedure for providing threto hydrophilic nature by the use of alcohol or the like when the resulting fiber or film is to be used for filtration of water or an aqueous solution, and further needs to be kept in wet state. In this process, accordingly, it becomes complicated to control or maintain the resulting fiber or film under satisfactory conditions.

SUMMARY OF THE INVENTION

The present inventors have studied to improve the above-described conventional porous hollow fiber, and found that a porous hollow fiber having a satisfactory hydrophilic nature for filtration of water or an aqueous solution and a function of filtration in the wide range such as precise filtration and ultrafiltration can be obtained by coating a conventional hollow fiber on the surfaces of its surrounding wall having a large number of micropores, particularly on the walls of the micropores, with ethylene oxide-grafted nylon.

There is provided by the present invention a porous hollow fiber provided with a large number of micropores in the surrounding wall, characterized in that walls of said pores are coated with ethylene oxide-grafted nylon.

In the porous hollow fiber of the invention, outer and inner surfaces of the surrounding wall preferably are further coated with ethylene oxide-grafted nylon.

In the porous hollow fiber of the invention, at least one of outer and inner surfaces of the surrounding wall may be coated with a non-porous layer of ethylene oxide-grafted nylon.

In the porous hollow fiber of the invention the micropores in the surrounding wall may be filled up with ethylene oxide-grafted nylon.

The porous hollow fiber of the invention which is coated with ethylene oxide-grafted nylon on the walls of the micropores in the surrounding wall has a sufficient hydrophilic nature required for filtration of substances such as water and aqueous solution. Further, the porous hollow fiber of the invention is appropriately employalbe for a wide range of filtration and separation such as precise filtration or ultrafiltration by appropriately adjusting or varying the coating conditions of ethylene oxide-grafted nylon. In addition, it is possible to provide satisfactory hydrophilic nature to the porous hollow fiber of the invention through a simple procedure, as compared with the conventional process for the preparatin of a porous hollow fiber having a hydrophilic nature. Furthermore, the porous hollow fiber of the invention can be favorably employed in filtration of substances such as water without being in wet state.

Figure 3:
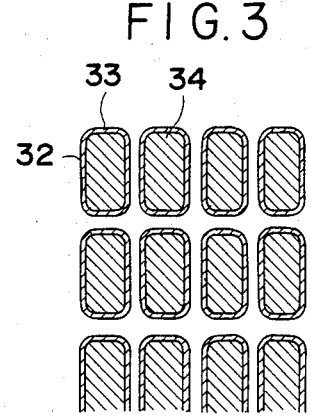
Figure 4:
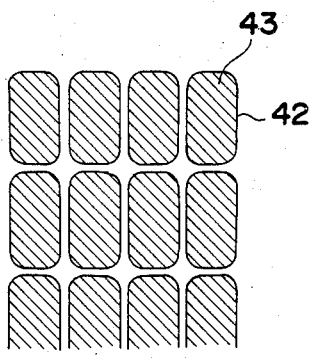

Each of FIGS. 3 and 4 is an enlarged view of the area (marked with X in FIG. 1) on the outer surface of the surrounding wall of other example of the porous hollow fiber according to the present invention.

DETAILED DESCRIPTION OF THE INVENTION

The porous hollow fiber of the invention will be described in detail below.

There is no specific limitation on the material of the porous hollow fiber of the invention having a large number of micropores in its surrounding wall. Examples of the materials include polymer materials such as polyolefins (e.g., high-density polyethylene, polypropylene, and poly(4-methylpentene-1)), fluorine-containing polymer compounds, polysulfone, polycarbonate or polyvinyl chloride; and inorganic materials such as glass, ceramics and carbonaceous material. Likewise, there is no specific limitation on the outer diameter of the porous hollow fiber, the thickness of the surrounding wall, and the pore size of the micropores in the surrounding wall. Generally, the outer diameter of the fiber is in the range of 10–1,000 μm, the thickness of the surrounding wall is in the range of 10–500 μm, and the pore size of micropores is in the range of 0.01–50 μm.

Ethylene oxide-grafted nylon employable in the invention can be obtained by graft polymerization of nylon with ethylene oxide in the absence or in the presence of catalyst such as alkaline catalyst.

In the invention, the graft ratio of ethylene oxide-grafted nylon means the molar amount of ethylene oxide per 1 mol. of nylon contained in the ethylene oxide-grafted nylon, which is determined on the NMR spectrum. That is, the graft ratio is expressed by a ratio ($S_E/S_N$) in which $S_N$ is a peak area in the vicinity of 2.7 ppm of the NMR spectrum corresponding to ($CO-CH_2$) of the nylon component and $S_E$ is a peak area in the vicinity of 4.0 ppm of the NMR spectrum corresponding to ($CH_2CH_2$)n 'of the ethylene oxide component, in which n is an integer within the range of generally 1–10, preferably 3–6.

From the viewpoints of hydrophilic nature and heat resistance of the resulting porous hollow fiber coated with ethylene oxide-grafted nylon, the ethylene oxide-grafted nylon to be employed in the invention generally has the graft ratio in the range 1 to 10, preferably 3 to 6.

Examples of the nylon components employable for the preparation of ethylene oxide-grafted nylon include nylon 6, nylon 66, nylon 12, nylon 610, nylon 11, nylon 6T and aromatic polyamide. Among those nylon components, preferred are nylon 6, nylon 66 and nylon 12, from the various viewpoints. For instance, they show satisfactory graft reaction with ethylene oxide accompanied by a relatively weak side reaction, they can be easily purified, and a variety of solvents are employable for dissolving the resulting polymer. In addition, they show relatively satisfactory solubility and can form a polymer having a melting point of not too low level.

The porous hollow fiber of the invention can be prepared by the following process.

In the first place, ethylene oxide-grafted nylon is dissolved in a solvent such as sulfuric acid, a mixture of alcohol and sulfuric acid, formic acid, a mixture of alcohol and formic acid, ethyl alcohol containing calcium chloride, to prepare a solution containing the ethylene oxide-grafted nylon. Subsequently, in the solution is dipped a porous hollow fiber to be sufficiently brought into contact with the solution even the walls of the micropores in the surrounding wall of the fiber.

In the second place, the ethylene oxide-grafted nylon is separated out of the solution to be deposited on the porous hollow fiber by addition of water to the solution. The fiber is then washed sufficiently with water to prepare a porous hollow fiber of the invention.

In the preparation of a porous hollow fiber of the invention, various conditions such as concentration of a solution of ethylene oxide-grafted nylon and concentration gradient of the solution within the micropores in the surrounding wall are appropriately selected so as to prepare a porous hollow fiber coated on the walls of the micropores with an extremely thin layer of ethylene oxide-grafted nylon. The concentration gradient of the ethylene oxide-grafted nylon solution can be formed, for instance, by a procedure of dipping the fiber at least twice in the solutions having different concentrations. In order to obtain a desired porous hollow fiber having the above-mentioned structure, there may be performed at plural times the aforementioned process comprising steps of dipping the fiber in the solution, separating out ethylene oxide-grafted nylon from the solution, washing the fiber with water, and drying the fiber. By appropriately selecting the above-mentioned conditions and processing periods, there can be obtained a variety of porous hollow fibers such as a fiber having almost the same inner diameter as the initial diameter, a fiber having a non-porous layer on at least one of the outer and inner surfaces of the surrounding wall, or a fiber having the micropores filled up with ethylene oxide-grafted nylon.

The porous hollow fiber prepared as above shows satisfactory hydrophilic nature.

The structure of the porous hollow fiber according to the invention is described more in detail referring to FIGS. 1 to 4.

Figure 1:
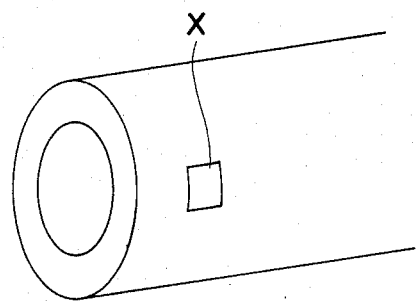
FIG. 1 is a perspective view of a porous hollow fiber according to the present invention.

FIG. 1 is a perspective view of a porous hollow fiber of the invention.

Figure 2:
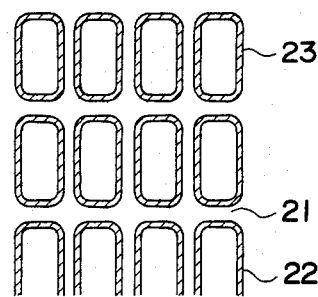
FIG. 2 is an enlarged view of the area (marked with X in FIG. 1) on the outer surface of the surrounding wall of one example of the porous hollow fiber according to the present invention.

Each of FIGS. 2 to 4 is an enlarged view of the area (marked with X in FIG. 1) on the outer surface of the sorrounding wall of examples of the porous hollow fiber according to the present invention.

As shown in FIG. 2, an outer surface 21 of the sorrounding wall of the porous hollow fiber has a large number of micropores 22. The walls of the micropores 22 are coated with a layer of ethylene oxide-grafted nylon 23. The layer of ethylene oxide-grafted nylon may be provided on the whole surface of the outer surface of the sorrounding wall of the porous hollow fiber.

FIG. 3 shows an outer surface 31 of the sorrounding wall of the porous hollow fiber having different structure from that of the fiber shown in FIG. 2. The walls of the micropores 32 are coated with a layer of ethylene oxide-grafted nylon 33. Further, the inner surface of the surrounding wall is coated with a non-porous layer of ethylene oxide-grafted nylon 34. The layer of ethylene oxide-grafted nylon may be provided on the whole surface of the outer surface of the sorrounding wall of the porous hollow fiber.

FIG. 4 shows a porous hollow fiber in which the micropores 42 are filled up or blocked up with ethylene oxide-grafted nylon 43. The layer of ethylene oxide-grafted nylon may be provided on the whole surface of the outer surface of the sorrounding wall of the porous hollow fiber.

The present invention will be illustrated by the following examples, but these examples by no means are construed to restrict the invention.

EXAMPLE 1

Polypropylene (UBE-PP-J109G, trade name, available from Ube Industries, Ltd., MFI=9 g/10 min.) was spun using a nozzle made for producing hollow fibers, which was equipped with a gas supplier tube of the diameter of 33 mm and inner diameter of 27 mm, under the conditions of the spinning temperature at 200° C. and take-up speed of 116 m/min. The obtained polypropylene hollow fiber was heat-treated for 6 minutes in an air bath heated to 145° C., and then the fiber was drawn in liquid nitrogen (at −195° C.) to give a length of 120 % based on the initial length. Subsequently, the drawn fiber was placed under the tension in the air bath heated at 145° C. for 2 minutes.

Thus treated hollow fiber was again drawn in an air atmosphere at a temperature of 145° C. to give a length of 400% based on the initial length. Then the drawn fiber was placed under the tension in the air bath heated at 145° C. for 15 minutes to obtain a porous polypropylene hollow fiber.

The average pore diameter and void ratio measured by a mercury porosimeter (POROSIMETRO SERIES 1500 produced by CARLOERBA Corp., Italy) were 0.55 μm and 75.2%, respectively.

In the porous polypropylene hollow fiber obtained as above, it was observed by the use of an electron microscope that a large number of micropores having a relatively large size were formed uniformly in the surrounding wall and those micropores had almost the same pore size as each other.

The outer diameter and inner diameter of the porous polypropylene hollow fiber were 400 μm and 300 μm, respectively.

Independently, nylon 6 (UBE-NYLON-P1011F, trade name, available from Ube Industries, Ltd.) was subjected to graft polymerization with ethylene oxide (available from Japan Catalyst Chemical Industries, Ltd., b.p.: 10.7° C.) by the conventional method to prepare ethylene oxide-grafted nylon. The ethylene oxide-grafted nylon was determined on the graft ratio by the NMR spectrum. The graft ratio thereof was 4.76.

Subsequently, the porous polypropylene hollow fiber obtained as above was first dipped in ethyl alcohol, and then dipped in ethyl alcohol solution containing 3% of calcium chloride and 3% of the ethylene oxide-grafted nylon prepared as above. Thereafter, the ethylene oxide-grafted nylon was separated out from the solution so as to be deposited on the surface of the porous polypropylene hollow fiber by addition of water. Thus treated polypropylene porous hollow fiber was washed with water and then dried. Thus, a porous hollow fiber of the invention was obtained.

The porous hollow fiber was observed on the outer and inner surfaces of the surrounding wall and the sectional portion of the surrounding wall by electron microscope. As a result, it was confirmed that a large number of micropores having almost the same size as that of the porous hollow fiber prepared prior to the treatment with ethylene oxide-grafted nylon were substantially kept in the surrounding wall of the porous hollow fiber without being filled up with ethylene oxide-grafted nylon.

The above porous hollow fiber was measured on the amount of water permeation when water was filtrated without being subjected to pretreatment with the alcohol and the like. The amount of water permeation was 28 l/min.m$^2$.atm.

COMPARISON EXAMPLE 1

Water was tried to be filtrated using the porous polypropylene hollow fiber prepared in Example 1 but with no treatment with ethylene oxide-grafted nylon and no pretreatment with the alcohol and the like, but the amount of water permeation was 0.

On the other hand, the porous polypropylene hollow fiber was subjected to the hydrophilic treatment, and then water was filtrated using the fiber. The amount of water permeation was 25 l/min.m$^2$.atm.

EXAMPLE 2

The procedure of Example 1 was repeated except for repeatin g one more time the process comprising steps of dipping the porous hollow fiber obtained in Example 1 in a solution of ethylene oxide-grafted nylon, separating out ethylene oxide-grafted nylon from the solution using water, and washing the fiber with water and drying, to prepare a porous hollow fiber.

The porous hollow fiber was observed on the outer and inner surfaces of the surrounding wall and the sectional portion of the surrounding wall by an electron microscope. As a result, it was confirmed that a large number of micropores having almost the same size as that of the porous hollow fiber prepared prior to the treatment with ethylene oxide-grafted nylon were substantially kept on the outer surface of the surrounding wall. On the inner surface of the surrounding wall of the porous hollow fiber was formed a non-porous layer of ethylene oxide-grafted nylon.

The porous hollow fiber was measured on the amount of water permeation when water was filtrated using the fiber without being subjected to pretreatment with the alcohol and the like. The amount of water permeation was 0.35 l/min.m$^2$.atm. Further, when physiologic saline containing 0.1% of albumin was filtrated using the porous hollow fiber, albumin never passed through the fiber.

We claim:

1. In a porous hollow fiber having a large number of micropores in its surrounding wall, the improvement in which walls of said pores are coated with ethylene oxide-grafted nylon.

2. The porous hollow fiber as claimed in claim 1, wherein outer and inner surfaces of the surrounding wall are further coated with ethylene oxide-grafted nylon.

3. The porous hollow fiber as claimed in claim 1, wherein at least one of outer and inner surfaces of the surrounding wall is coated with a non-porous layer of ethylene oxide-grafted nylon.

4. The porous hollow fiber as claimed in claim 1, wherein said micropores in the surrounding wall are filled up with ethylene oxide-grafted nylon.

5. The porous hollow fiber as claimed in claim 1, wherein said ethylene oxide-grafted nylon contains at least one nylon component selected from the group consisting of nylon 6, nylon 66 and nylon 12.

6. The porous hollow fiber as claimed in claim 1, wherein said ethylene oxide-grafted nylon has a graft ratio in the range of 1 to 10, said graft ratio being expressed by molar amount of ethylene oxide per 1 mol. of nylon.

7. The porous hollow fiber as claimed in claim 1, wherein said ethylene oxide-grafted nylon has a graft ratio in the range of 3 to 6, said graft ratio being expressed by molar amount of ethylene oxide per 1 mol. of nylon.

* * * * *